US012663203B2

(12) United States Patent
Eldes et al.

(10) Patent No.: US 12,663,203 B2
(45) Date of Patent: Jun. 23, 2026

(54) COOLING DEVICE HAVING A HANDLE GROOVE

(71) Applicant: BSH Hausgeräte GmbH, Munich (DE)

(72) Inventors: Onur Eldes, Mersin (TR); Muratcan Malkoc, Tekirdag (TR); Ercan Engin, Tekirdag (TR)

(73) Assignee: BSH Hausgeräte GmbH, Munich (DE)

( * ) Notice: Subject to any disclaimer, the term of this patent is extended or adjusted under 35 U.S.C. 154(b) by 0 days.

(21) Appl. No.: 18/729,260

(22) PCT Filed: Jul. 6, 2023

(86) PCT No.: PCT/EP2023/068674
§ 371 (c)(1),
(2) Date: Jul. 16, 2024

(87) PCT Pub. No.: WO2024/041798
PCT Pub. Date: Feb. 29, 2024

(65) Prior Publication Data

US 2025/0093091 A1 Mar. 20, 2025

(30) Foreign Application Priority Data

Aug. 26, 2022 (TR) ............................... 2022/013473

(51) Int. Cl.
*F25D 23/02* (2006.01)
*E05B 1/00* (2006.01)

(52) U.S. Cl.
CPC .......... *F25D 23/028* (2013.01); *E05B 1/0015* (2013.01)

(58) Field of Classification Search
CPC ................. F25D 23/028; E05B 1/0015; A47B 2095/026
See application file for complete search history.

(56) References Cited

U.S. PATENT DOCUMENTS 5,740,587 A * 4/1998 Onai ..................... E05B 1/0015 16/412
8,485,617 B2 * 7/2013 Park ...................... F25D 23/028 312/405.1
9,308,677 B2 4/2016 Lee et al.
10,151,524 B2 12/2018 Ding et al.
11,287,175 B2 * 3/2022 Lee ......................... F25D 23/02
11,320,192 B2 * 5/2022 Lee ......................... F25D 23/02
(Continued)

FOREIGN PATENT DOCUMENTS

CN 106288615 B * 6/2020
DE 102021211433 A1 * 4/2023 ........... F25D 23/028
(Continued)

*Primary Examiner* — William L Miller
(74) *Attorney, Agent, or Firm* — Laurence A. Greenberg; Werner H. Stemer; Ralph E. Locher

(57) ABSTRACT

A cooling device has a main body with a storage compartment in the main body. At least one door is mounted on the main body and provides access into the storage compartment. The door has an outer panel facing outside and an inner panel adjacent the outer panel. The inner panel has a main outer wall lying between the outer panel and the inner panel. A lateral sidewall of the main outer wall has an outwardly bent free-end portion extending at least partly along a longitudinal axis of the door for creating a volume in which a handle groove arranged to receive fingers of the user is attached.

14 Claims, 11 Drawing Sheets

(56) References Cited

U.S. PATENT DOCUMENTS

| | | | | |
|---|---|---|---|---|
| 11,402,147 | B2 * | 8/2022 | Lee | F25D 23/02 |
| 11,796,243 | B2 * | 10/2023 | Park | F25D 23/10 |
| 11,821,676 | B2 * | 11/2023 | Son | F25D 23/025 |
| 12,055,340 | B2 * | 8/2024 | Pagnozzi | F25D 23/02 |
| 12,264,869 | B2 * | 4/2025 | Hong | F25D 23/02 |
| 12,270,594 | B2 * | 4/2025 | Kim | F25D 23/028 |
| 2011/0273071 | A1 * | 11/2011 | Kim | F25D 23/028<br>312/405 |
| 2012/0326587 | A1 * | 12/2012 | Jeong | F25D 23/02<br>312/405 |
| 2016/0209110 | A1 * | 7/2016 | Cho | F25D 23/062 |
| 2018/0142941 | A1 | 5/2018 | Arslankiray et al. | |
| 2022/0196316 | A1 * | 6/2022 | Caglin | F25D 23/02 |
| 2025/0052480 | A1 * | 2/2025 | Gold | E05B 1/0015 |

FOREIGN PATENT DOCUMENTS

| | | | | |
|---|---|---|---|---|
| EP | 3001127 B1 | | 2/2019 | |
| JP | 7755983 B2 | * | 10/2025 | |
| WO | WO-2016009398 A1 | * | 1/2016 | F25D 23/028 |

* cited by examiner

COOLING DEVICE HAVING A HANDLE GROOVE

TECHNICAL FIELD OF THE INVENTION

The present invention relates to a cooling device which has main body and a storage compartment in the main body. At least one door is mounted on the main body and provides access into the storage compartment. The at least one door has an outer panel facing outside and an inner panel adjacent the outer panel.

BACKGROUND OF THE INVENTION

A door of a cooling device is provided to allow access to the interior space of the cooling device and separate the storage compartment from the outside environment. To facilitate the opening and closing of the door, a handle is usually provided on the door. Such handles of the cooling device have various shapes that match the overall shape of the cooling device.

In the art, some handles of the cooling devices are produced in an outward-curving manner in order to match with the doors, to be held easily, and in order to improve esthetic appearance.

A prior art publication in the technical field of the invention may be referred to as WO2016009398 (A1), which discloses a refrigerator comprising a door, a user interface housing fixed to a heat-insulating material, a user interface housing having a first receiving space, and the first receiving space being open towards a side of the door to receive the user interface electrical module; and a handle member.

SUMMARY OF THE INVENTION

An object of the present invention is to provide a cooling device having a hidden handle with effective packaging properties and desired firmness.

The present invention proposes a cooling device comprising a main body; a storage compartment disposed into the main body; at least one door mounted onto the main body and providing access into the storage compartment wherein the door has an outer panel facing outside and an inner panel provided adjacent to the outer panel. The inner panel has a main outer wall lying between the outer panel and the inner panel, wherein a lateral sidewall of the main outer wall has an outwardly bended free-end portion extending at least partly along a longitudinal axis of the door for creating a volume in which a handle groove arranged to receive fingers of the user is attached. Thus, a useful volume is created for receiving a hidden handle part which also eliminates the necessity of an external handle. Moreover, eliminating the usage of external handles provides effective packaging.

In a possible embodiment, the handle groove is attached to the lateral sidewall of the main outer wall. Thus, the handle groove is placed at the sidewall of the door which is hidden and is held easily by the user.

In a possible embodiment, the handle groove has an inwardly bent handle recess accessible through the handle groove for receiving fingers when opening the door. Thus the door can be held easily by the user.

In a possible embodiment, the handle groove is arranged to extend substantially the entire length of the free-end portion of the main outer wall. Thus, the handle can be held from many different positions desired by the user.

In a possible embodiment, the handle groove is arranged between two mutual flat-shaped cover members. Thus, it is ensured that the handle is kept in a position that provides a better opening. In addition, material savings are provided in terms of production.

In a possible embodiment, the handle groove has an upper portion that is initially gradually curved and then extends parallel with respect to the outer panel. Thus, the user is provided to hold the door more comfortably and well before opening or closing the door.

In a possible embodiment, the free-end portion has a U-shaped cross-section and faces the outer panel. This reverse-shaped arrangement creates additional useful space.

In a possible embodiment, the projection of the outwardly shaped free-end portion is arranged to remain behind a lateral side wall of the outer panel. Thus, accurate positioning between the outer and the inner panels is facilitated for a hidden handle.

In a possible embodiment, the free-end portion of the main outer wall has a fastening hole for receiving a fastening member wherein the fastening member is attached to the lateral side wall for fastening a support member. Thus, the rigidity of the door is increased especially in the regions where needed.

In a possible embodiment, the support member has a substantially U-shaped cross-section. This arrangement provides optimum strength in the proximity of a hidden handle.

In a possible embodiment, a corner bracket is placed in a corner of the main outer wall and is attached to the lateral sidewall with a fastening member. Thus, the rigidity of the door is increased at the corners of the door.

In a possible embodiment, the lateral sidewall of the main outer wall has an inwardly bended attachment recess for receiving the handle groove. This arrangement helps to place and hide the handle groove within the created volume.

Both a front wall of the storage compartment extending in a direction parallel to the movable separators and the movable separators are made of transparent material. Therefore, the articles behind the movable separators become visible to the user.

The proposed door may be a rotatable door pivotally connected to the main body of the cooling device or may be a drawer-type door pushably connected to the main body. The door may close one or more storage compartments of the cooling device or may close a part of one or more storage compartments.

The outer panel may be formed of a material, such as glass, resin, metal, wood, or ceramic.

BRIEF DESCRIPTION OF THE FIGURES

The accompanying drawings are given solely for the purpose of exemplifying the invention whose advantages over prior art were outlined above and will be explained in detail hereinafter.

DETAILED DESCRIPTION OF THE FIGURES

Figure 1:
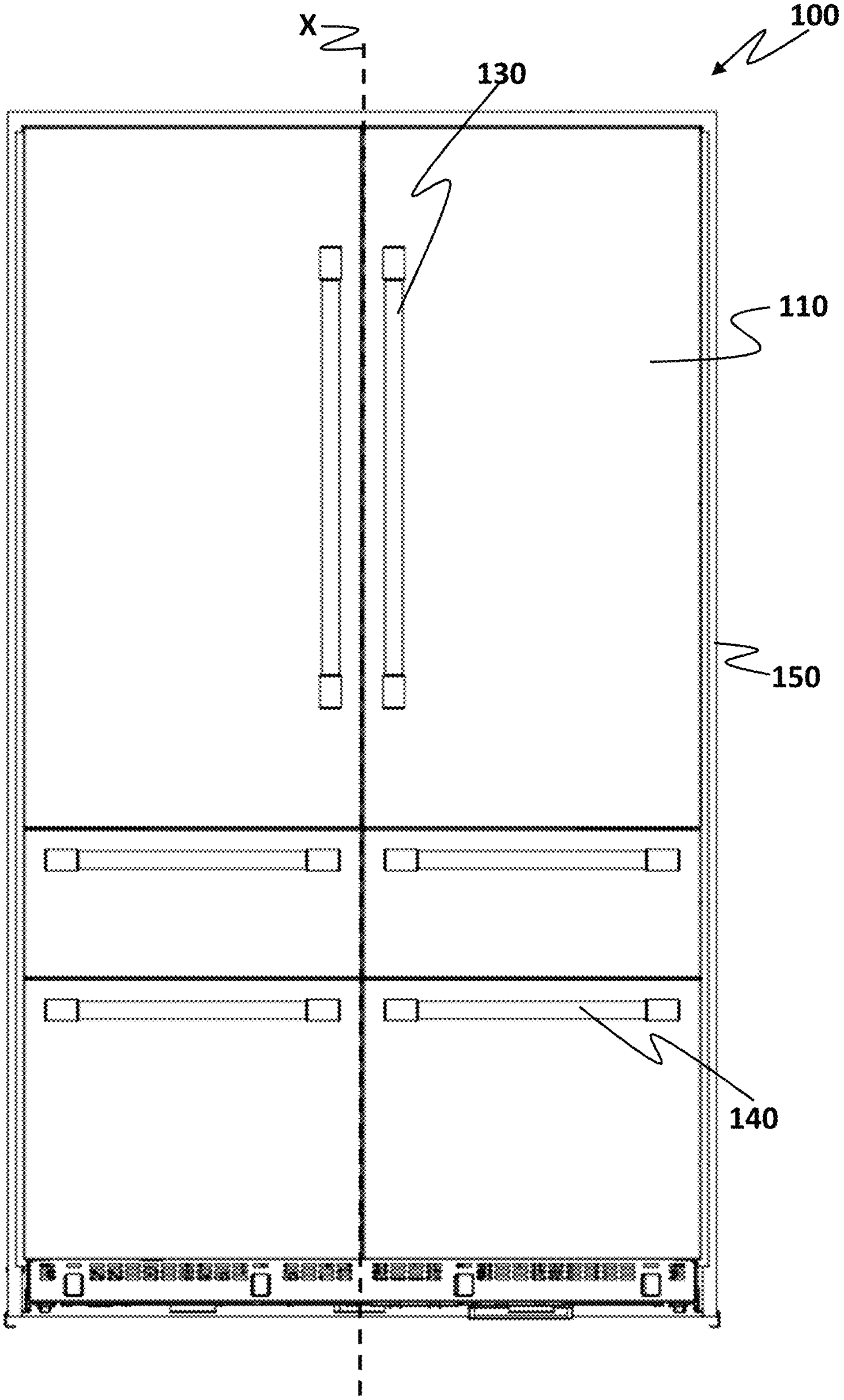
FIG. 1 is a front view of a cooling device according to the present invention.

FIG. 1 is a front view of a cooling device (100) according to a preferable embodiment of the present invention. As shown in FIG. 1, the cooling device (100), embodied as a refrigerator, includes a main body (150) having a storage compartment (160) disposed of side by side. The shown cooling device (100) further includes a pair of oppositely-opened doors (110) connected to the main body (150) to respectively close the corresponding storage compartments (160).

Figure 5:
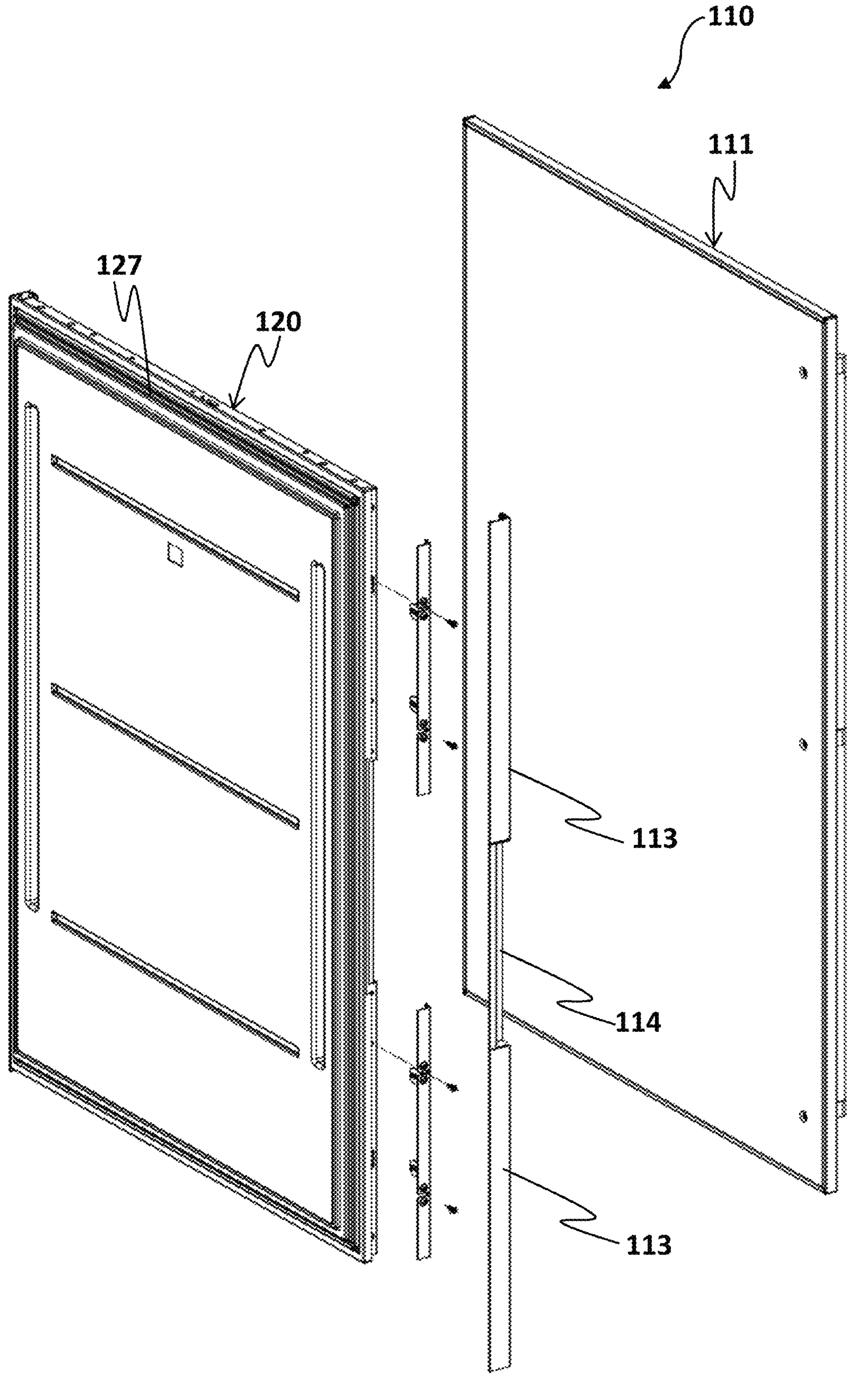
FIG. 5 is a perspective view of the door of the cooling device showing an inner panel and an outer panel, according to the present invention.
Figure 6:
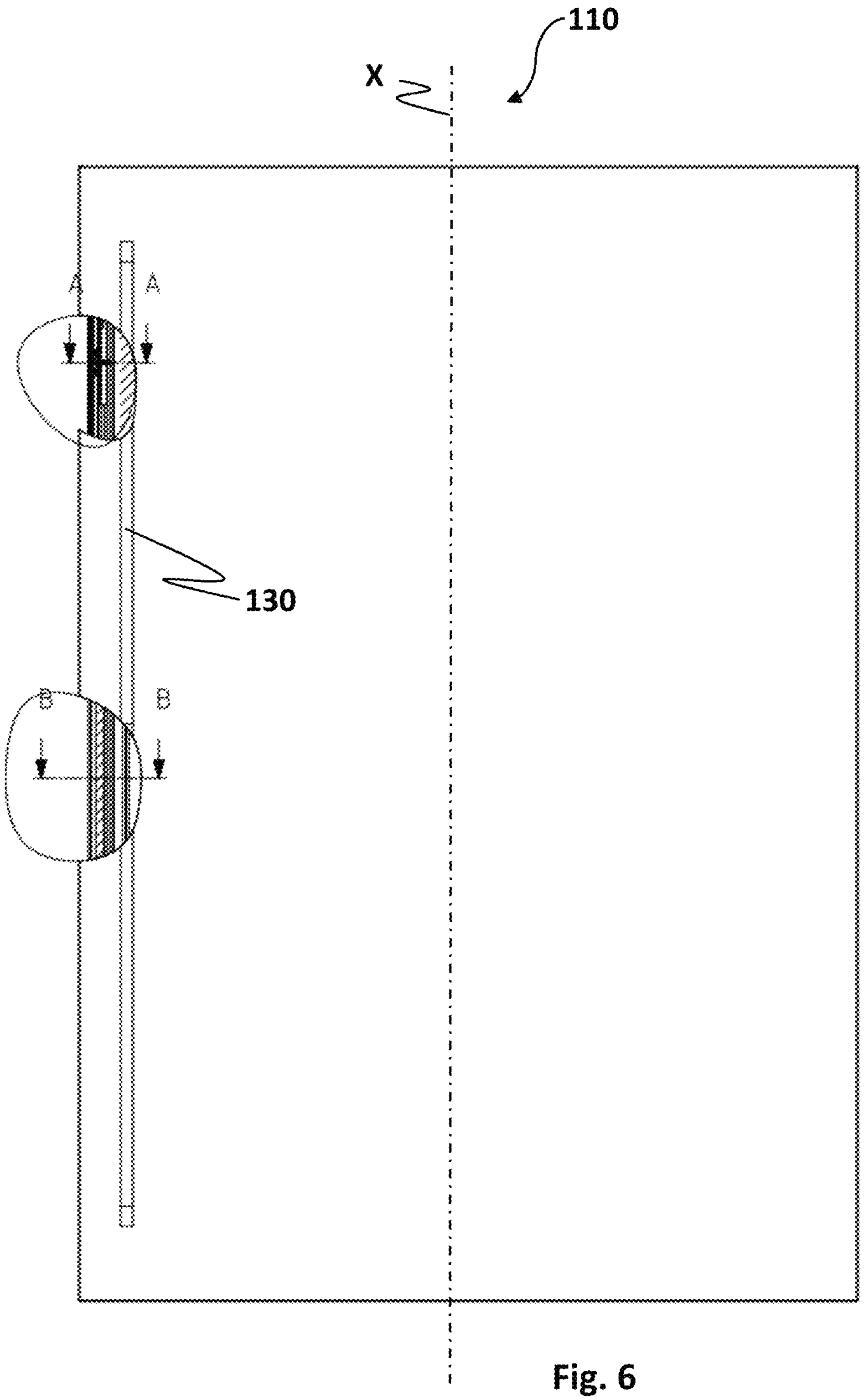
FIG. 6 is a front view of the door of the cooling device indicating different cross-sections along the longitudinal axis of the door, according to the present invention.

According to the present invention, the cooling device (100) comprises the main body (150); the storage compartment (160) disposed into the main body (150); at least one door (110) mounted onto the main body (150) and providing access into the storage compartment (160). The door (110) of the cooling device (100) has an outer panel (111) facing outside and an inner panel (120) provided adjacent to the outer panel (111). The outer panel (111) and the inner panel (120), preferably, form the door (110) of the cooling device (100) as a single unit. Referring to FIG. 5, each inner panel (120) and the outer panel (111) can be manufactured independently, and then the parts can be fixed (for example, pasted, attached). The outer panel (111) has an outer panel covering (118) forming an outer periphery of the outer panel (111) with an inner material (119) which may be formed of a material, such as glass, resin, metal, wood or ceramic. The inner material (119) is an inner filling member.

Figure 7:
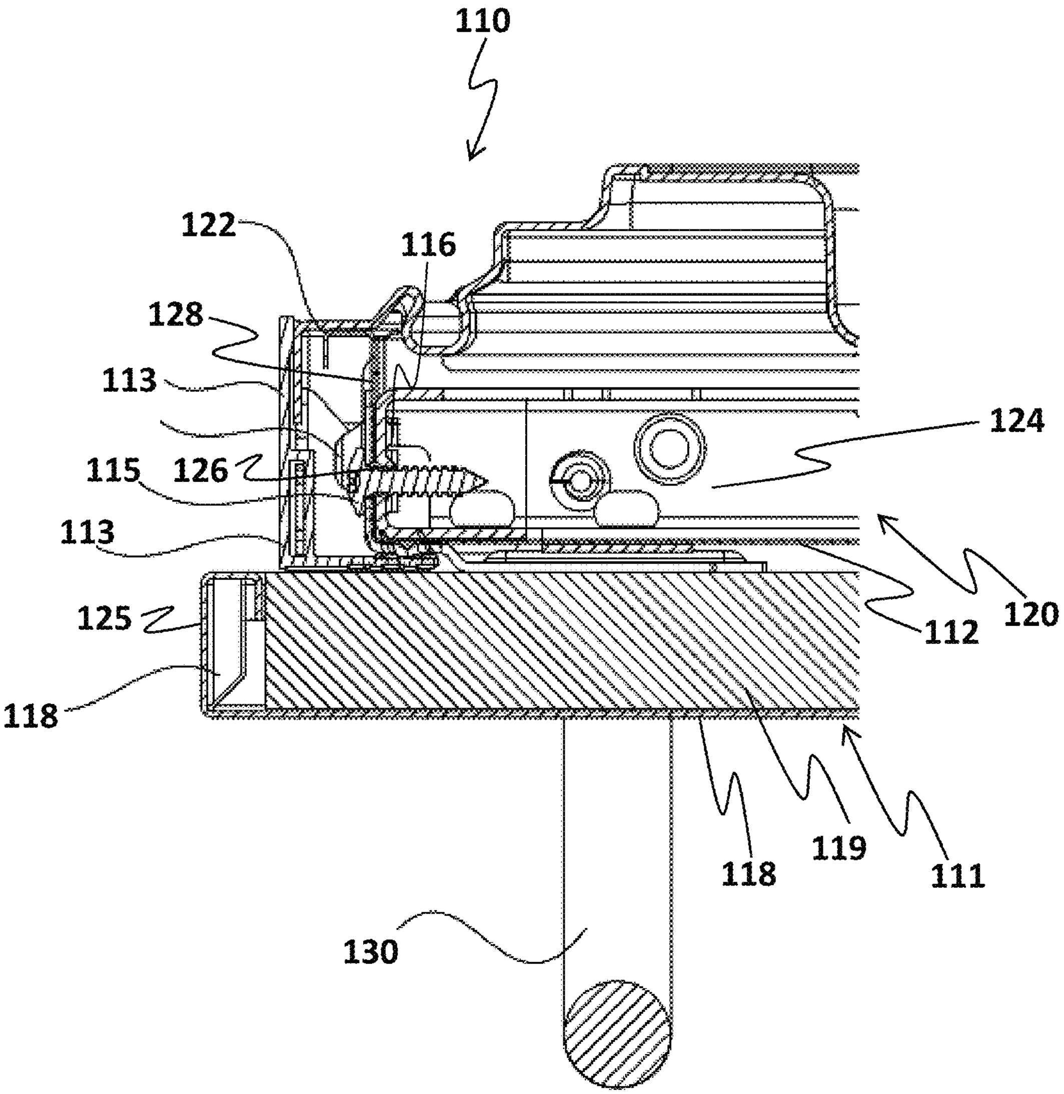
FIG. 7 is a cross-section view taken along A-A line shown in FIG. 6.
Figure 8:
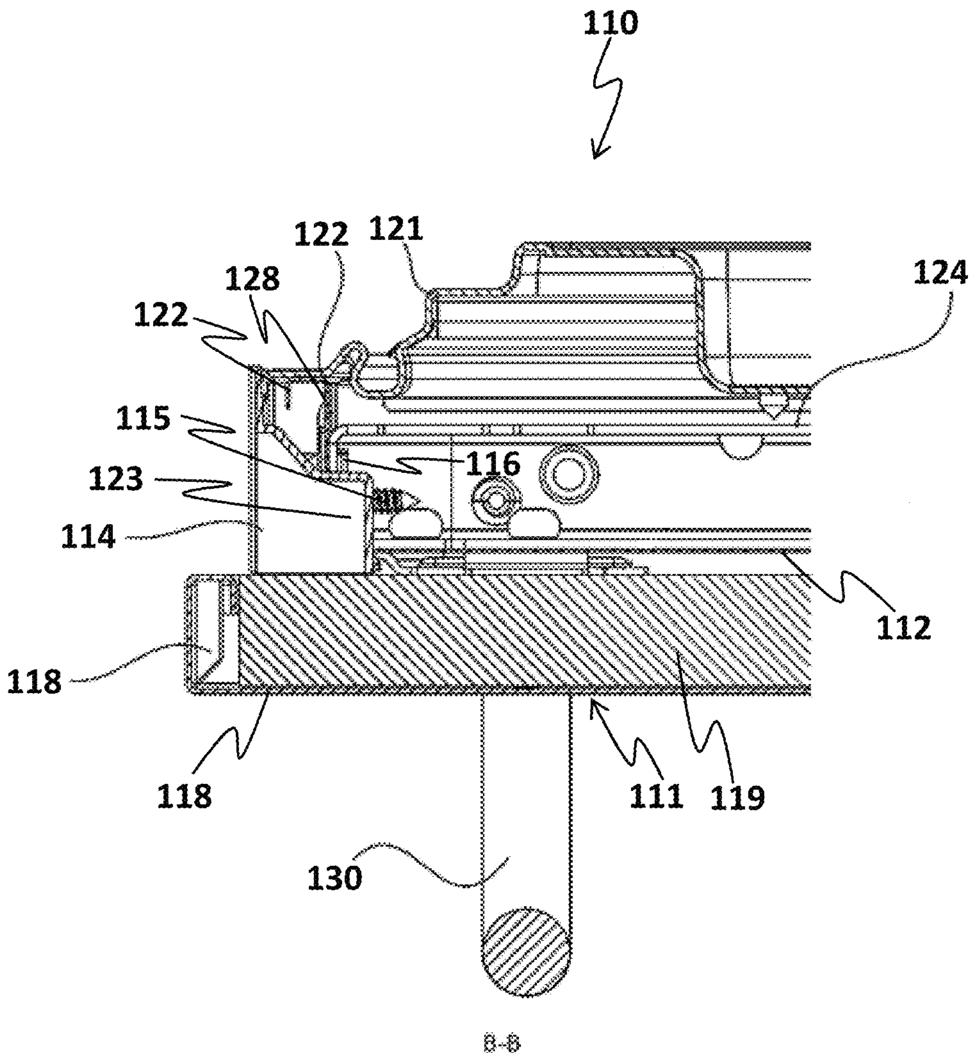
FIG. 8 is a cross-section view taken along B-B line shown in FIG. 6.
Figure 9:
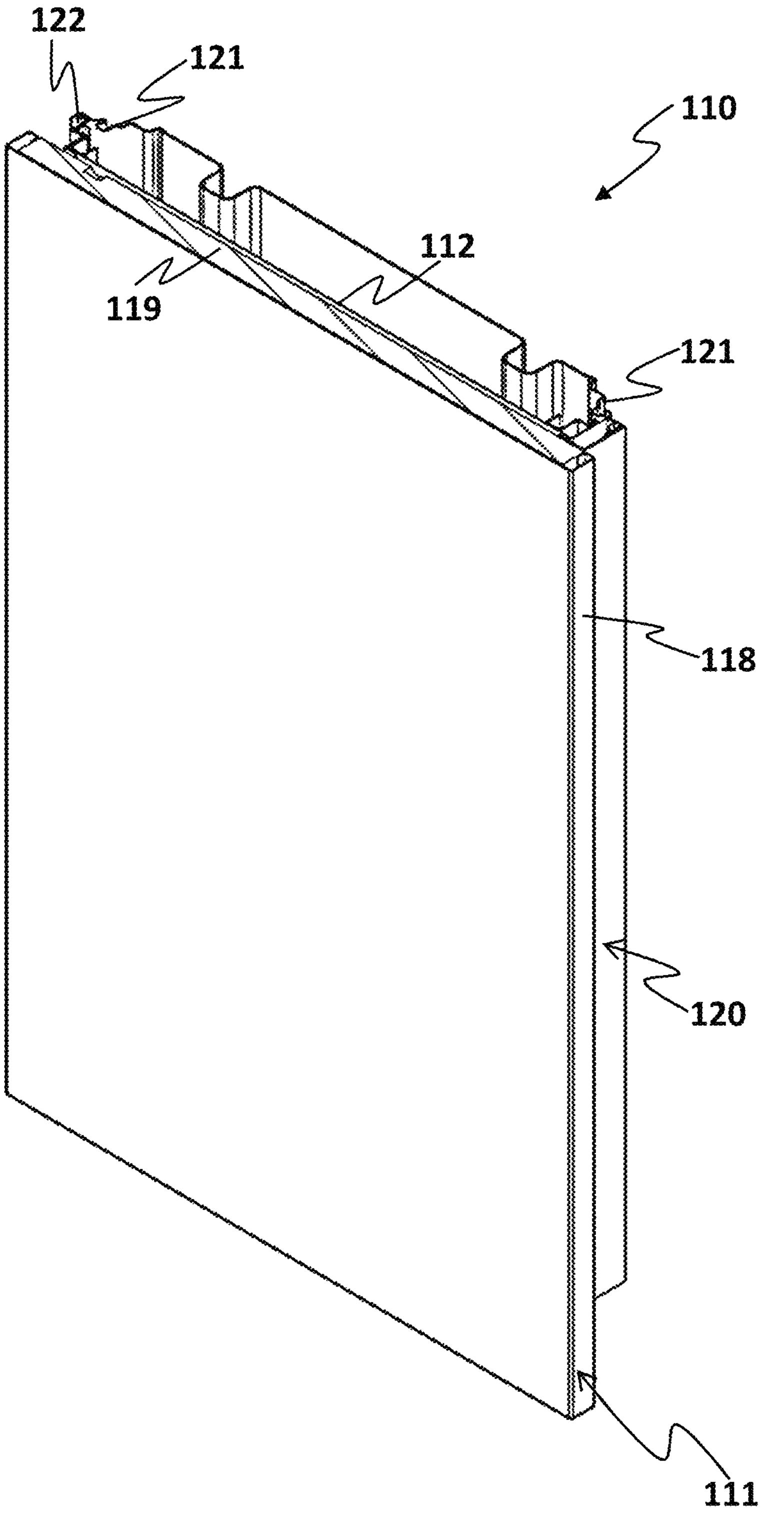
FIG. 9 is a partially perspective view of the door, according to the present invention.
Figure 10:
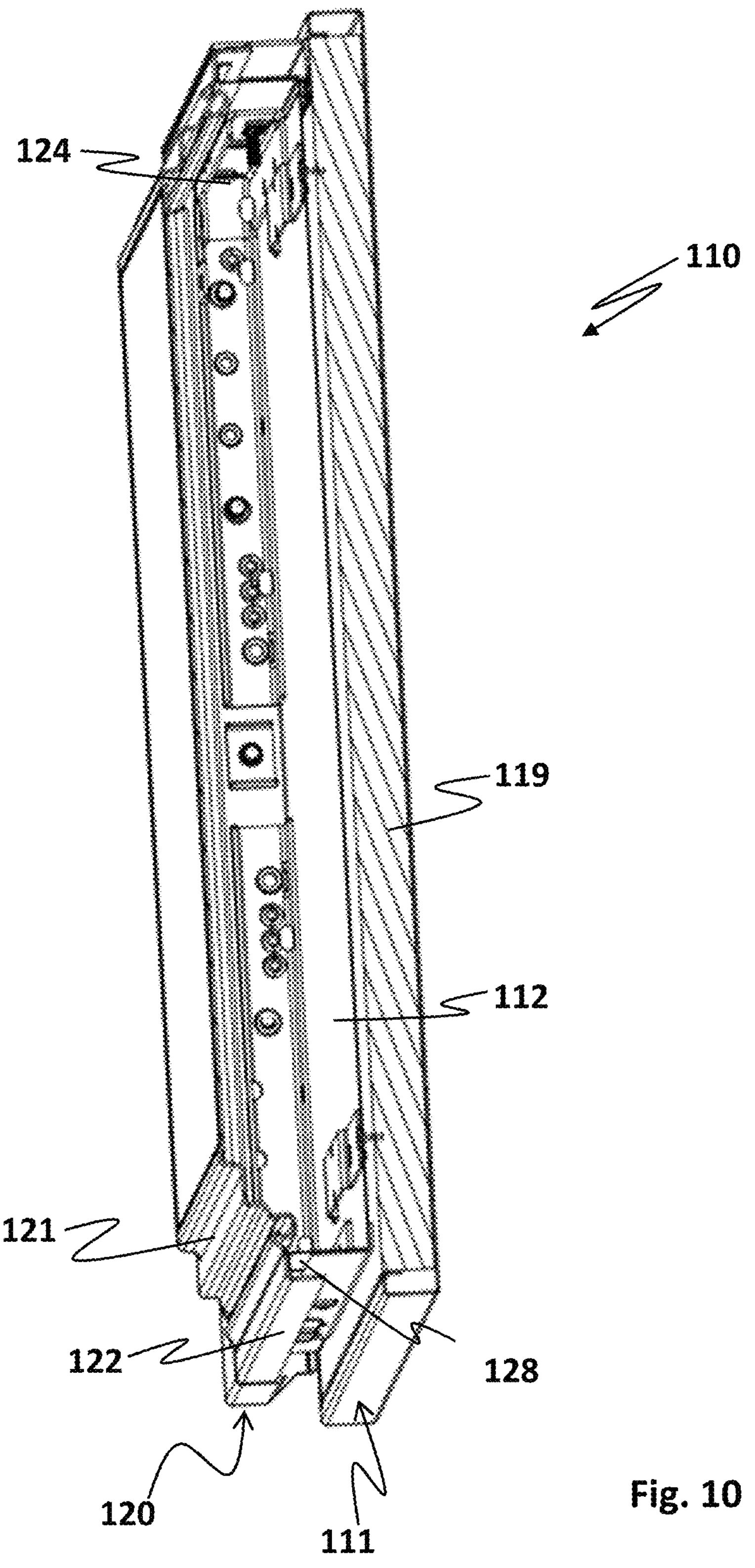
FIG. 10 is another partially upper perspective view of the door, according to the present invention.

Referring to FIGS. 7 and 8, the inner panel (120) has a main outer wall (112) with a planar surface lying between the outer panel (111) and the inner panel (120), wherein the main outer wall (112) is one of the main carriers of the door (110). At least one of the lateral sidewalls (128) of the main outer wall (112), facing outside, has an outwardly bended free-end portion (122) extending at least partly along a longitudinal axis of the door (X) for creating a volume in which a handle groove (114) is arranged to receive fingers of the user when opening the door (110). Advantageously, the lateral sidewall (128) is shaped and dimensioned to create a useful volume therein. With this arrangement, the handle groove (114) is arranged to be attached to the inner panel (120). This outwardly bended free-end portion (122) can extend all along the circumference of the lateral sides of the main outer wall (112). The handle groove (114) is arranged to be not visible when looking at the cooling device (100) from the front side, but it is arranged in a discreet way so that the user can insert her hand from the lateral side of the door (110). Referring to FIGS. 9 and 10, the main outer wall (112) abuts the outer panel (111) and forms the inner panel (120) of the door (110).

Referring to FIG. 8, the handle groove (114) has an inwardly bended handle recess (123) accessible through the handle groove (114) for receiving fingers when opening or closing the door (110). The handle recess (123) is initially curved in a sloping manner and then extends in a vertical direction with respect to the outer panel (111). When opening or closing the door (110), the user's hand can extend into the handle groove (114).

The handle groove (114) formed as a gradually inwardly bended part. The location and the length of the handle groove (114) can be arranged with respect to the user's desire. Referring to FIG. 5, the handle groove (114) is arranged between two mutual flat-shaped cover members (113). These flat-shaped cover members (113) have a planar sidewall that extends in a vertical manner with respect to the outer panel (111). The handle groove (114) and the cover members (113) form a single part that is attachable to the lateral sidewall (128) of the main outer wall (112). In a possible embodiment, the handle groove (114) is arranged to extend substantially the entire length of the lateral sidewall (128) of the main outer wall (112) which is parallel to the longitudinal axis of the door (X). In a possible embodiment, the handle groove (114) is attached to the cover members (113) by means of fastening members at the ends thereof. Referring to FIGS. 5, 7, and 8, the handle groove (114) has an upper portion that is initially gradually curved and then extends parallel with respect to the outer panel (111).

Referring to FIGS. 7 and 8, the free-end portion (122) has a U-shaped cross-section and the end of the free-end portion faces an inner planar surface of the outer panel (111). The projection of the free-end portion (122) is arranged to remain behind a sidewall (125) of the outer panel (111).

Figure 11:
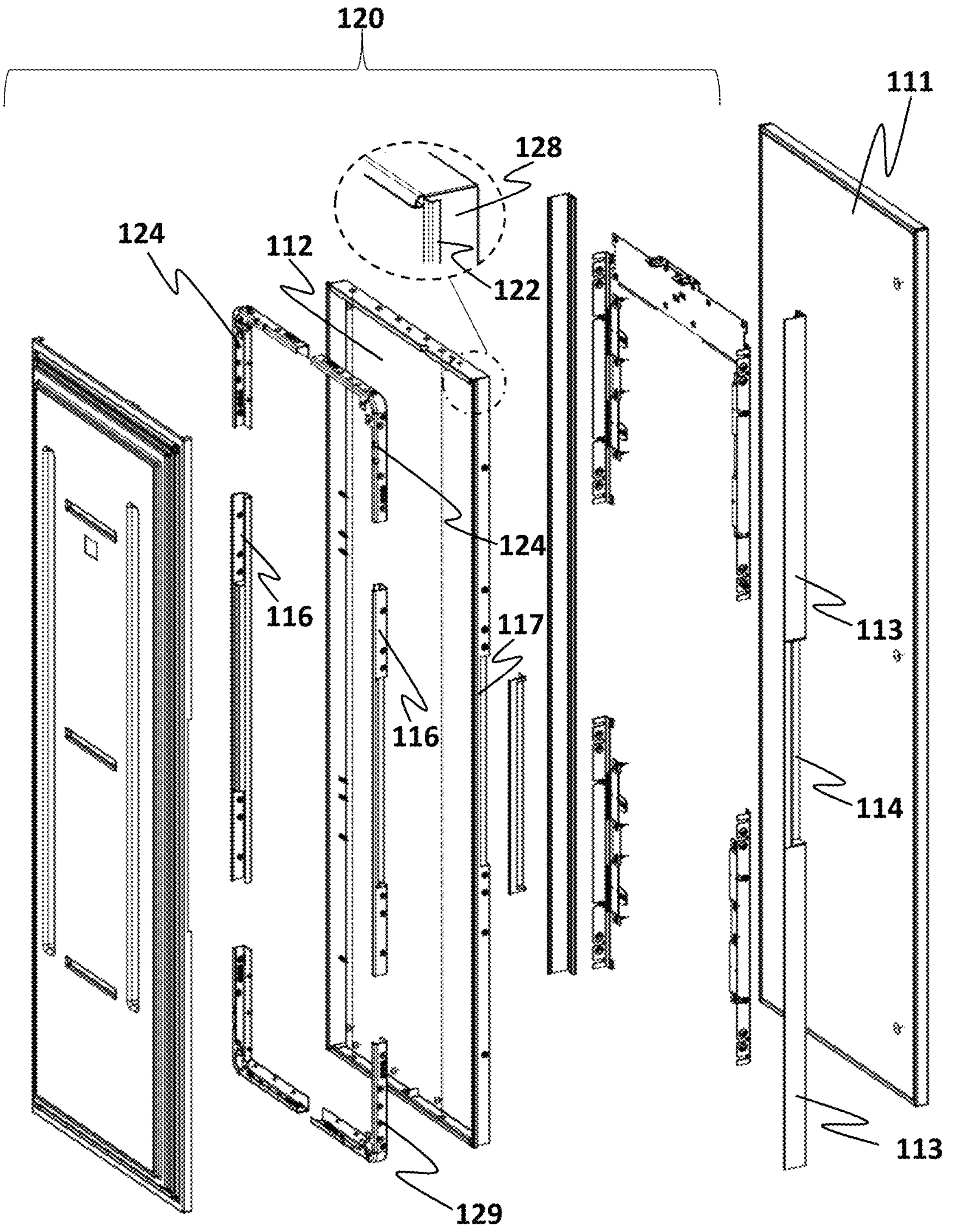
FIG. 11 is an exploded view of the door, according to the present invention.

The lateral sidewall (128) of the main outer wall (112) can have a circular fastening hole (126) for receiving at least one fastening member (115) which is attached to the lateral sidewall (128) for fastening a support member (116). As can be seen in FIGS. 7 and 8, the support member (116) is attached to an inner wall of the lateral sidewall (128) and has a substantially U-shaped cross-section. Referring to FIGS. 7, 10, and 11, a plurality of upper corner brackets (124) and lower corner brackets (129) are also placed at the corners of the main outer wall (112) and are attached to the lateral sidewall (128) with another fastening member (115). The corner brackets (124, 129) have a preferably L-shaped cross-section for increasing the rigidity therein.

Figure 2:
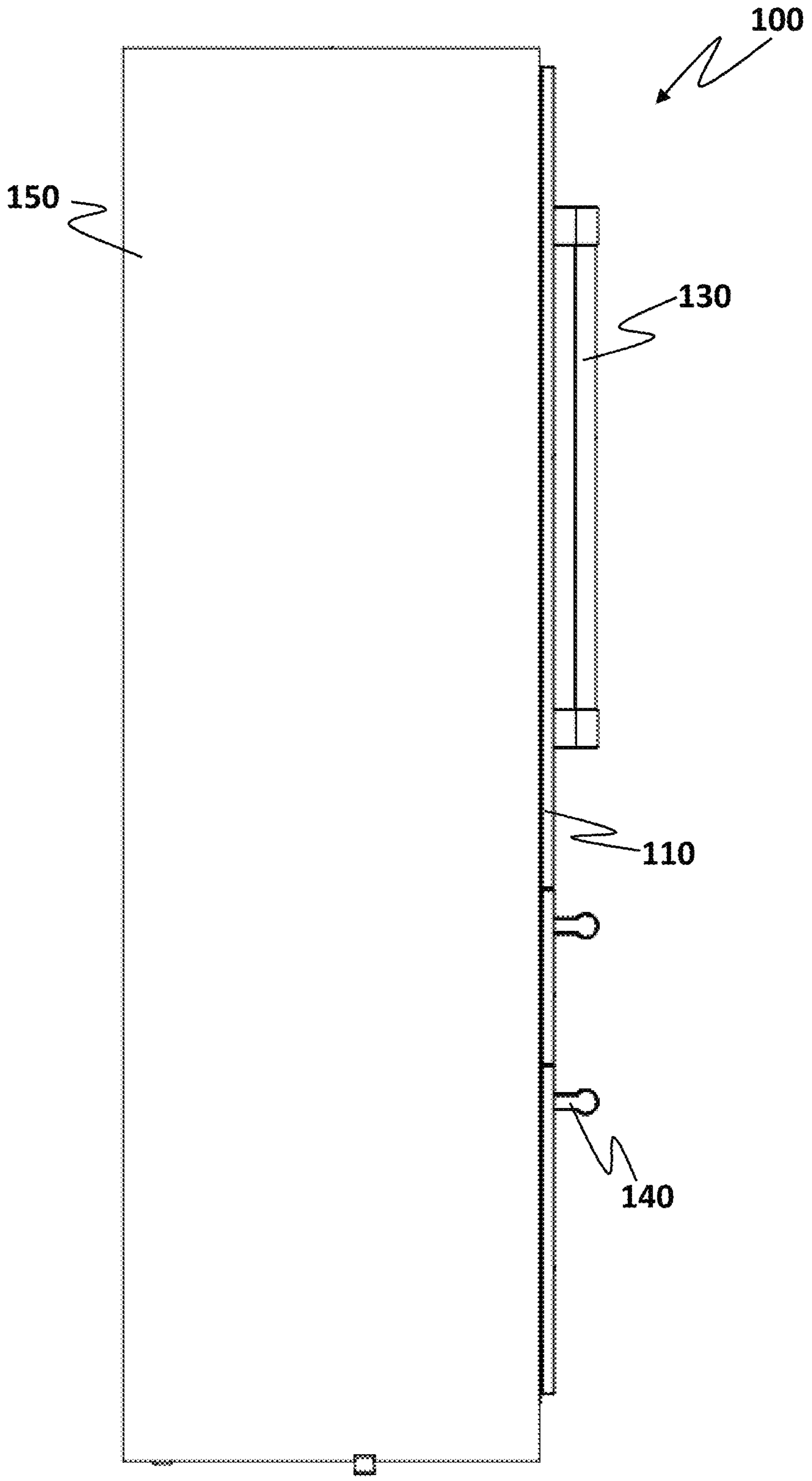
FIG. 2 is a side view of the cooling device according to the present invention.
Figure 3:
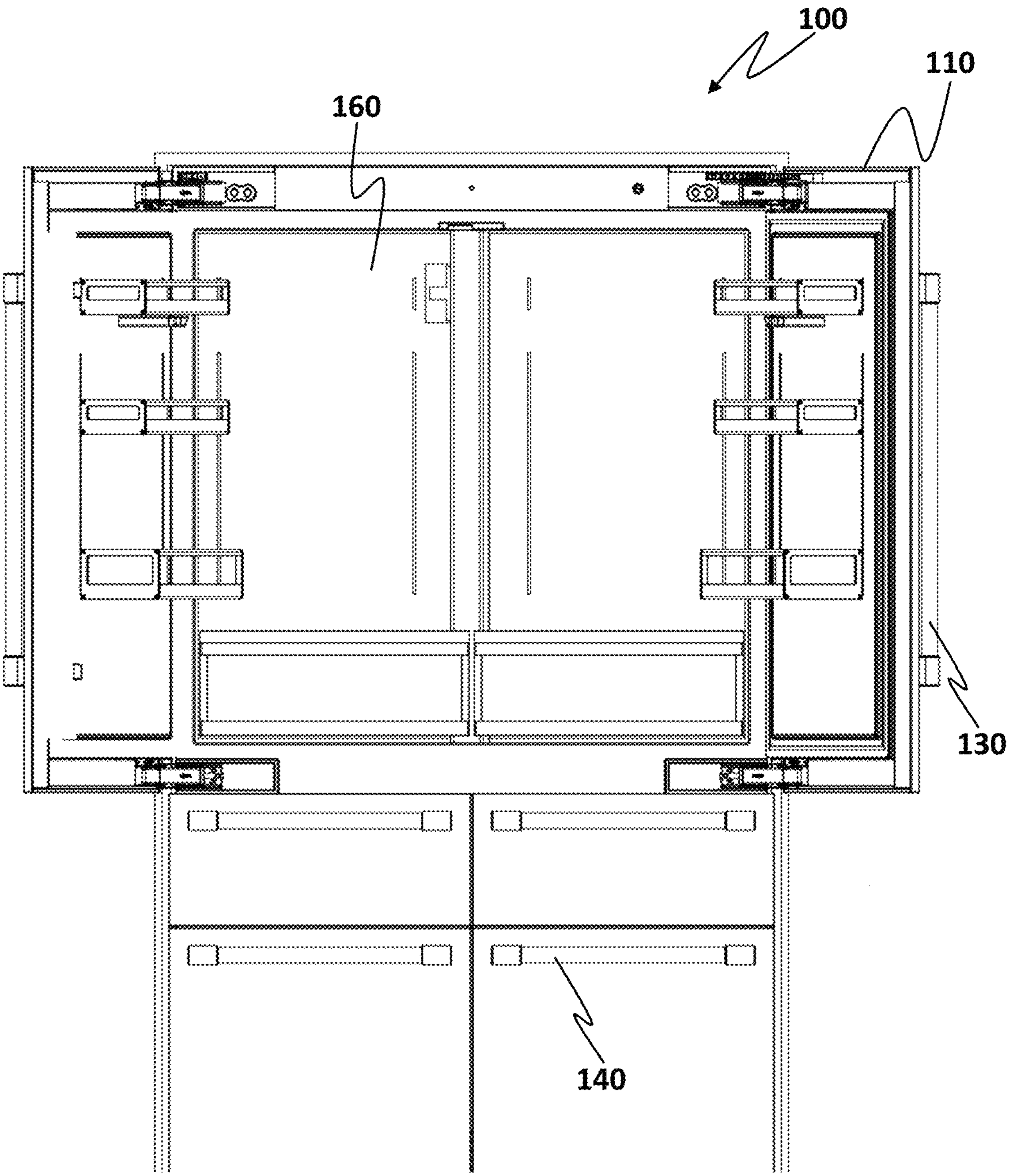
FIG. 3 is a front view of the cooling device wherein the upper doors are opened, according to the present invention.
Figure 4:
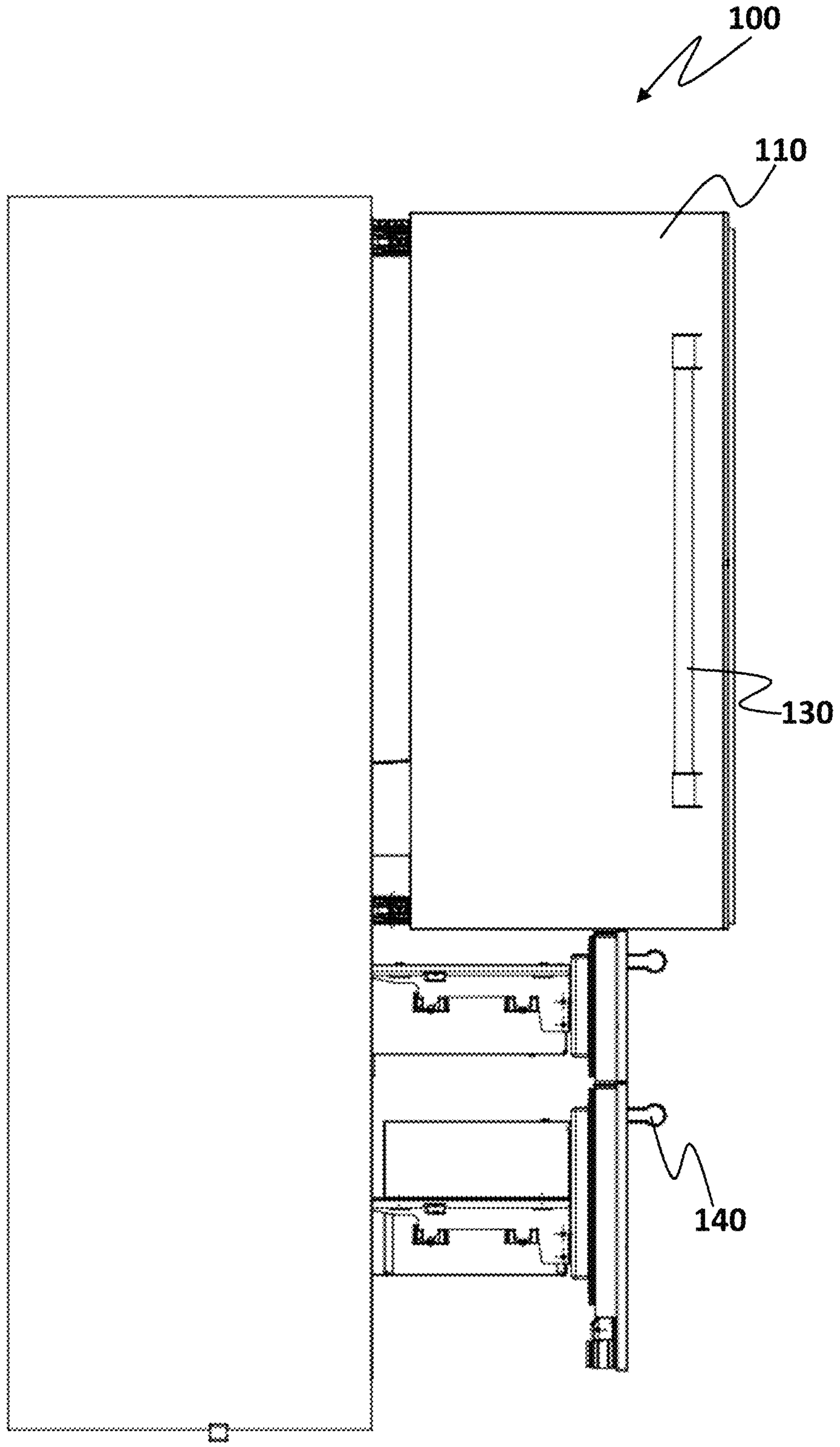
FIG. 4 is a side view of the cooling device wherein the upper doors are opened and the lower drawers are pulled, according to the present invention.

The outer panel (111) can be made of a glass plate/ceramic plate/resin plate, or the like, during the manufacturing process. Referring to FIGS. 2 and 3, the outer panel (111) of the door (110) is provided with a first type handle (130) and/or second type handle (140). Referring to FIG. 1, vertically-oriented first-type handles (130) are provided on a pair of oppositely-opened doors (110). Horizontally-oriented second type handles (140) are provided on each lower drawer of the cooling device (100). Such handles are optional and can be detached in necessity. Detaching the handles from the door (110) can be carried out by using a tool or not using a tool without damaging the door (110). With the help of the handle groove (114), the necessities of the classical type handles are eliminated. The cooling device (100) is supplied to the user without these handles and more comfortable packaging and transportation are provided. According to the user's request, these handles can be attached or removed later.

The inner panel (120) is provided with circumferentially arranged gasket housing (121) for mounting the gasket (127). The gasket (127) is mounted at an inner edge of the inner panel (120) and is in contact with the main body (150) to prevent the cold air in the storage compartment (160) from leaking outside the cooling device (100) when the door (110) is closed.

FIG. 11 is an exploded view of the door (110) in which the preferred parts of the door (110) can be clearly seen. Referring to FIG. 11, the lateral sidewall (128) of the main outer wall (112) has an inwardly bended attachment recess (117) for receiving the handle groove (114). This inwardly extending attachment recess (117) suitably receives the handle recces (123) of the handle groove (114).

The present invention may be to a refrigerator having a first storage compartment and a second storage compartment that is vertically distributed, and or may be applicable to a refrigerator, in which a pair of doors close the same storage compartment. The storage compartment (160) of the cooling device (100) may be used to store food and/or wine. For example, the refrigerator may have at least one storage compartment purely used for storing drinks.

REFERENCE LIST

- 100. Cooling device
- 110. Door
  - 111. Outer panel
  - 112. Main outer wall
  - 113. Cover member
  - 114. Handle groove
  - 115. Fastening member
  - 116. Support member
  - 117. Attachment recess
  - 118. Outer panel covering
  - 119. Inner material
  - 120. Inner panel
  - 121. Gasket housing
  - 122. Free-end portion
  - 123. Handle recess
  - 124. Upper corner bracket
  - 125. Sidewall
  - 126. Fastening hole
  - 127. Gasket
  - 128. Lateral sidewall
  - 129. Lower corner bracket
- 130. First type handle
- 140. Second type handle
- 150. Main body
- 160. Storage compartment
- X. Longitudinal axis of the door

The invention claimed is:

1. A cooling device, comprising:
a main body having a storage compartment inside the main body;
at least one door mounted to said main body and providing access into said storage compartment;
said at least one door having an outer panel facing outward and an inner panel adjacent said outer panel;
said inner panel having a main outer wall lying between said outer panel and said inner panel;
said main outer wall having a lateral sidewall with an outwardly bent free-end portion extending at least partly along a longitudinal axis of said at least one door for forming a volume in which a handle groove arranged to receive fingers of a user of the cooling device is attached, and said free-end portion having a U-shaped cross-section facing said outer panel.

2. The cooling device according to claim 1, wherein said handle groove is configured for attachment to said lateral sidewall of said main outer wall.

3. The cooling device according to claim 2, wherein said handle groove is formed with an inwardly bent handle recess accessible through said handle groove.

4. The cooling device according to claim 2, wherein said handle groove extends substantially an entire length of said lateral sidewall parallel to the longitudinal axis of said at least one door.

5. The cooling device according to claim 2, wherein said handle groove is arranged between two substantially flat cover members.

6. The cooling device according to claim 2, wherein said handle groove has an upper portion that is initially gradually curved and then extends parallel to said outer panel.

7. The cooling device according to claim 1, wherein a projection of said outwardly bent free-end portion is formed to remain behind a lateral sidewall of said outer panel.

8. The cooling device according to claim 1, wherein said lateral sidewall of said main outer wall is formed with a fastening hole for receiving a fastening member.

9. The cooling device according to claim 8, wherein said fastening member is configured for attachment to said free-end portion for fastening at least one support member.

10. The cooling device according to claim 9, wherein said at least one support member has a substantially U-shaped cross-section.

11. The cooling device according to claim 1, which comprises a plurality of corner brackets disposed in corners of said main outer wall.

12. The cooling device according to claim 1, wherein said lateral sidewall of said main outer wall is formed with an inwardly bent attachment recess for placing said handle groove.

13. A cooling device, comprising:
a main body having a storage compartment inside the main body;
at least one door mounted to said main body and providing access into said storage compartment;
said at least one door having an outer panel facing outward and an inner panel adjacent said outer panel;
said inner panel having a main outer wall lying between said outer panel and said inner panel;
said main outer wall having a lateral sidewall with an outwardly bent free-end portion extending at least partly along a longitudinal axis of said at least one door for forming a volume in which a handle groove arranged to receive fingers of a user of the cooling device is attached; and
said lateral sidewall of said main outer wall being formed with a fastening hole for receiving a fastening member, and said fastening member being configured for attachment to said free-end portion for fastening at least one support member.

14. A cooling device, comprising:
a main body having a storage compartment inside the main body;
at least one door mounted to said main body and providing access into said storage compartment;
said at least one door having an outer panel facing outward and an inner panel adjacent said outer panel;
said inner panel having a main outer wall lying between said outer panel and said inner panel;
a plurality of corner brackets disposed in corners of said main outer wall; and
said main outer wall having a lateral sidewall with an outwardly bent free-end portion extending at least partly along a longitudinal axis of said at least one door for forming a volume in which a handle groove arranged to receive fingers of a user of the cooling device is attached.

* * * * *